(12) United States Patent
Li et al.

(10) Patent No.: US 11,983,183 B2
(45) Date of Patent: May 14, 2024

(54) TECHNIQUES FOR TRAINING MACHINE LEARNING MODELS USING ACTOR DATA

(71) Applicant: Disney Enterprises, Inc., Burbank, CA (US)

(72) Inventors: Boyang Li, San Mateo, CA (US); Hannah Kim, Atlanta, GA (US); Denys Katerenchuk, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 255 days.

(21) Appl. No.: 16/057,440

(22) Filed: Aug. 7, 2018

(65) Prior Publication Data

US 2020/0050677 A1 Feb. 13, 2020

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/9535* (2019.01); *G06N 20/00* (2019.01)

(58) Field of Classification Search
CPC .......... G06F 16/24578; G06F 16/9535; G06F 16/248; G06N 20/00; G06K 9/00; G06K 9/00711; G06Q 10/00; G06Q 10/06
See application file for complete search history.

(56) References Cited

U.S. PATENT DOCUMENTS

| | | | | |
|---|---|---|---|---|
| 2002/0028021 A1* | 3/2002 | Foote | ................ | G06K 9/00758 382/224 |
| 2005/0125307 A1* | 6/2005 | Hunt | ................ | G06Q 30/0217 705/26.61 |

(Continued)

OTHER PUBLICATIONS

Kim, Hannah, et al. "Learning Joint Gaussian Representations for Movies, Actors, and Literary Characters." Proceedings of the Thirthy-Third AAAI Conference on Artificial Intelligence. AAAI. 2019. (Year: 2019).*

(Continued)

*Primary Examiner* — Brittany N Allen
*Assistant Examiner* — William P Bartlett
(74) *Attorney, Agent, or Firm* — Dorsey & Whitney LLP

(57) ABSTRACT

Systems, methods, and articles of manufacture are disclosed for learning models of movies, keywords, actors, and roles, and querying the same. In one embodiment, a recommendation application optimizes a model based on training data by initializing the mean and co-variance matrices of Gaussian distributions representing movies, keywords, and actors to random values, and then performing an optimization to minimize a margin loss function using symmetrical or asymmetrical measures of similarity between entities. Such training produces an optimized model with the Gaussian distributions representing movies, keywords, and actors, as well as shift vectors that change the means of movie Gaussian distributions and model archetypical roles. Subsequent to training, the same similarity measures used to train the model are used to query the model and obtain rankings of entities based on similarity to terms in the query, and a representation of the rankings may be displayed via, e.g., a display device.

20 Claims, 6 Drawing Sheets

(51) Int. Cl.
*G06F 16/9535* (2019.01)
*G06N 20/00* (2019.01)

(56) References Cited

U.S. PATENT DOCUMENTS

| | | | | |
|---|---|---|---|---|
| 2006/0190369 | A1* | 8/2006 | Ryles | G06Q 40/00 705/35 |
| 2010/0008643 | A1* | 1/2010 | Rakib | G06F 16/748 386/341 |
| 2010/0169369 | A1* | 7/2010 | Wang | G06F 16/48 707/770 |
| 2013/0124984 | A1* | 5/2013 | Kuspa | H04N 21/4307 715/255 |
| 2013/0177203 | A1* | 7/2013 | Koo | G06K 9/00664 382/103 |
| 2016/0057499 | A1* | 2/2016 | Foerster | H04N 21/4758 705/319 |
| 2017/0024391 | A1* | 1/2017 | Steck | G06F 16/9535 |
| 2017/0078621 | A1* | 3/2017 | Sahay | G06F 40/186 |
| 2017/0249549 | A1* | 8/2017 | Bai | G06K 9/00771 |
| 2019/0026680 | A1* | 1/2019 | Sen | H04N 21/8133 |
| 2019/0138880 | A1* | 5/2019 | Akella | G06V 40/20 |
| 2019/0279075 | A1* | 9/2019 | Liu | G06N 3/084 |
| 2019/0303404 | A1* | 10/2019 | Amer | G06F 40/216 |
| 2019/0370669 | A1* | 12/2019 | Pais | G06F 16/90335 |
| 2020/0175457 | A1* | 6/2020 | Tamilselvam | G06F 18/2413 |

OTHER PUBLICATIONS

A. Bordes, N. Usunier, A. Garcia-Duran, J. Weston, and O. Yakhnenko. 2013. Translating embeddings for modeling multi-relational data. In Advances in Neural Information Processing Systems 26, 9 pages.

Tomas Mikolov, Ilya Sutskever, Kai Chen, Greg Corrado, and Jeffrey Dean. 2013. Distributed Representations of Words and Phrases and their Compositionality. In Proceedings of Neural Information Processing Systems.

Jeffrey Pennington, Richard Socher, and Christopher D Manning. 2014. Glove: Global Vectors for Word Representation . . . In Proceedings of the Conference on Empirical Methods in Natural Language Processing, vol. 14. 1532-1543.

Luke Vilnis and Andrew McCallum. 2015. Word representations via Gaussian embedding. In Proceedings of the 3rd International Conference on Learning Representations.

Zhen Wang, Jianwen Zhang, Jianlin Feng, and Zheng Chen. 2014. Knowledge Graph Embedding by Translating on Hyperplanes. In Proceedings of the Twenty-Eighth AAAI Conference on Artificial Intelligence.

He, S.; Liu, K.; Ji, G.; and Zhao, J. 2015. Learning to rep- resent knowledge graphs with Gaussian embedding. In Proceedings of the 24th ACM International on Conference on Information and Knowledge Management.

* cited by examiner

TECHNIQUES FOR TRAINING MACHINE LEARNING MODELS USING ACTOR DATA

BACKGROUND

Field of the Invention

Embodiments presented in this disclosure generally relate to recommendation and search engines. More specifically, embodiments presented herein relate to techniques for learning models of movies, keywords, actors, and roles, and querying the same.

Description of the Related Art

The motion picture industry has been extremely risky. Despite the best efforts of directors, casting directors, screenwriters, marketing teams, and experienced executives, it remains difficult to guarantee a return on investment from any movie production.

Recently, the computational understanding of narrative content, in textual and visual formats, has received renewed attention. However, in the context of movies in particular, little attempt has been made to understand movie actors in relation to characters they play and movies they appear in.

SUMMARY

One embodiment of this disclosure provides a computer-implemented method that generally includes training, based at least in part on received training data, a model which includes Gaussian distributions representing actors, movies, and keywords. The method further includes receiving a query including one or more terms, and ranking, using the trained model, one or more of the actors, movies, or keywords, based at least in part on similarity to the one or more terms in the query.

Another embodiment provides a computer-implemented method that generally includes receiving information specifying at least movies, keywords describing the movies, and actors appearing in the movies. The method further includes initializing means and co-variance matrices of a plurality of Gaussian distributions representing the movies, keywords, and actors with random values. In addition, the method includes optimizing, based at least in part on the received information, the plurality of Gaussian distributions representing the movies.

Yet another embodiment provides a computer-implemented method that generally includes receiving text describing one or more movies and characters therein, and performing coreference resolution to link pronouns in the received text with the characters. The method also includes identifying words in the received text associated with actions performed by the characters, actions received by the characters, and descriptions of the characters, and mapping the identified words associated with the actions performed by the characters, the actions received by the characters, and the descriptions of the characters to numerical representations. The method further includes averaging the numerical representations of the words associated with the actions performed by the characters, the actions received by the characters, and the descriptions of the characters, and concatenating, for each character, the averaged numerical representations associated with the character into a vector representing the character. In addition, the method includes identifying archetypical roles as clusters of the vectors representing the characters, and training a model based, at least in part, on the identified archetypical roles.

Other embodiments include, without limitation, a computer-readable medium that includes instructions that enable a processing unit to implement one or more embodiments of the disclosed methods, as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
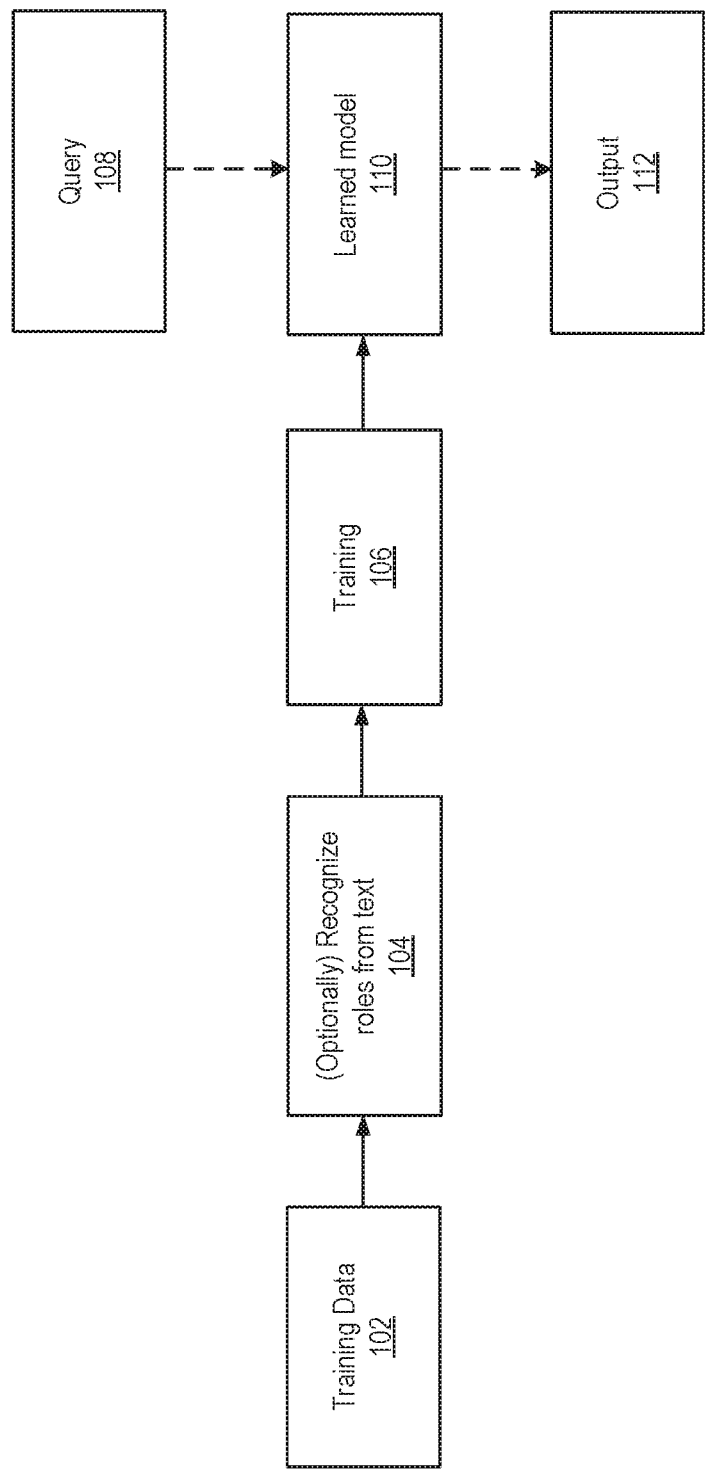
FIG. 1 illustrates an approach for learning models of movies, keywords, actors, and roles, and querying the same, according to an embodiment.

Embodiments presented herein provide a joint representation learning framework for learning models of movies, keywords, actors, and roles, and querying the same. As used herein, "keywords" refer to labels that describe certain aspects of movies, such as the genre of a movie or more specific keywords such as "dysfunctional family" or "talking animal." Keywords may be specified in any suitable manner, such as by users of a movie review website or administrators of such a website. In one embodiment, a recommendation application optimizes a model based on training data by initializing the mean and co-variance matrices of Gaussian distributions representing movies, keywords, and actors entities with random values, and performing an optimization to minimize a margin loss function using symmetrical or asymmetrical measures of similarity between entities. Although referred to herein as a "recommendation application," it should be understood that such an application may also be capable of processing queries other than in the context of recommendations, as discussed in greater detail below. The output of training by the recommendation application is a model that includes the Gaussian distributions representing the movie, keyword, and actor entities, as well as shift vectors that change the means of movie Gaussian distributions and model archetypical roles. Alternatively, archetypical roles may be modeled by changes to the co-variance matrices of movie Gaussian distributions. That is, the learning framework disclosed herein embeds actors, movies, and descriptive keywords as Gaussian distributions in a high-dimensional space, in which character archetypes are also represented, as either shift vectors or changes to co-variance matrices of the movie Gaussian distributions. Subsequent to training, the same similarity measures used to train the model are used to query the model and obtain rankings of entities based on similarity to terms in the query, and a representation of the rankings may then be displayed via, e.g., a display device.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a recommendation application) or related data available in the cloud. For example, the recommendation application could execute on a computing system in the cloud and generate models of movies, keywords, actors, and roles. Such models may then be stored at a storage location in the cloud and queried by users. Doing so allows a user to access this information from any computing system attached to a network connected to the cloud (e.g., the Internet).

Referring now to FIG. 1, an approach is shown for learning models of movies, keywords, actors, and roles, and querying the same, according to one embodiment. As shown, a recommendation application (e.g., the recommendation application 622 discussed below with respect to FIG. 6) receives training data as input at 102; (optionally) recognizes roles that actors play from received text (e.g., describing the plots of movies) at 104; trains a model using the training data, including the recognized roles, at 106; receives a query at 108; and, in response to the query, uses the trained model at 110 to generate an output that may be displayed to a user via, e.g., a display device at 112.

Figure 2:
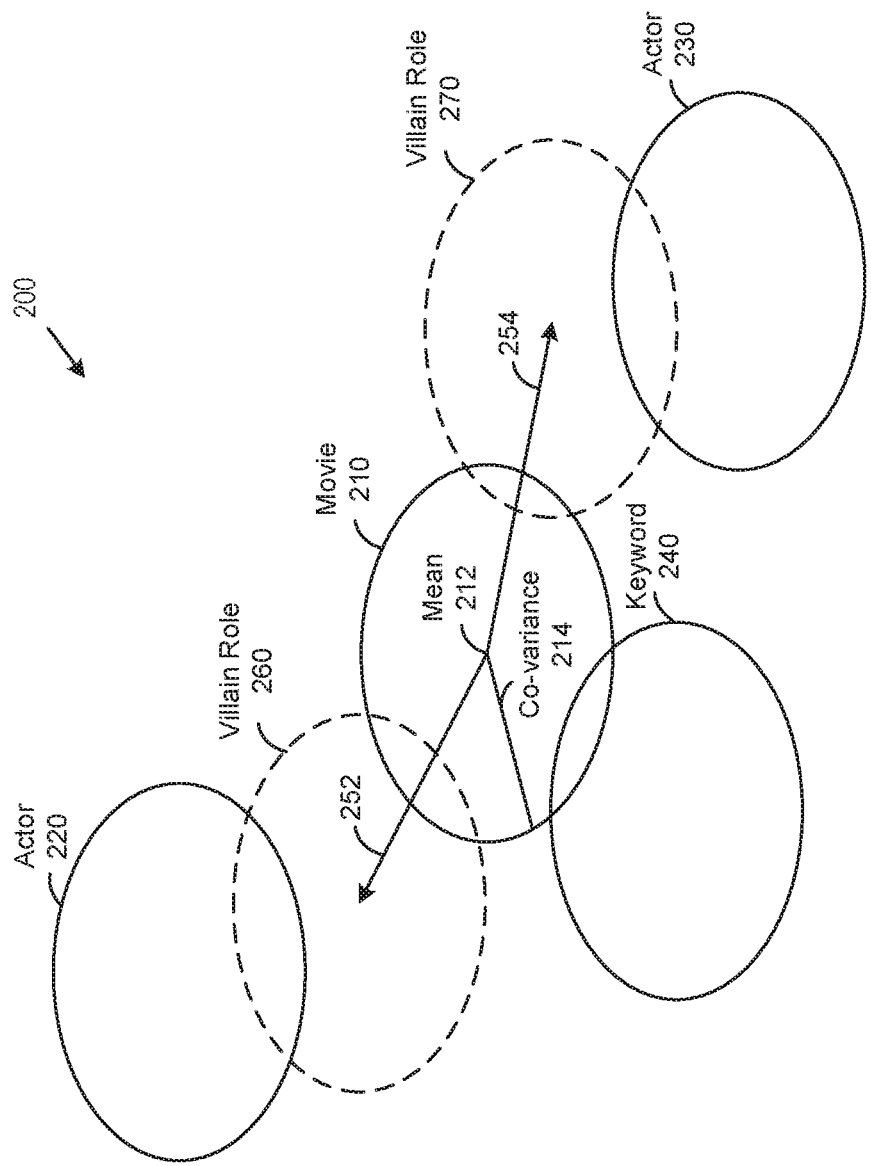
FIG. 2 illustrates an example model of a movie, keyword, actors, and roles, according to an embodiment.

In one embodiment, the recommendation application receives at 102 training data that includes movies, keywords, actors, and roles information. The roles that actors play may alternatively be determined automatically from received text at 104, as discussed in greater detail below. At 106, the recommendation application trains a model by "pushing" around randomly-initialized Gaussian distributions representing the movies, keywords, and actors in the high-dimensional space such that Gaussian distributions representing related movies, keywords, and actors are pushed together and may overlap, while Gaussian distributions representing unrelated movies, keywords, and actors are pushed apart. An example model 200 of a movie, keyword, actors, and roles is shown in FIG. 2. As shown, Gaussian distributions 210, 220, 230, and 240 in the model 200 represent movies, keywords that describe those movies, actors, and roles, respectively. Gaussian distributions are also sometimes referred to as normal distributions. Each Gaussian distribution is described by a mean (e.g., mean 212 of the movie Gaussian distribution 210) specifying a location of the Gaussian distribution in a high-dimensional (e.g., 40-dimensional) space and a co-variance matrix (e.g., the co-variance 214 of the movie Gaussian distribution 210) specifying how dense the Gaussian distribution is. Unlike vector representations in which each entity becomes a single point in space, Gaussian representations are able to model the uncertainty or the entire spectrum of semantic meaning.

In one embodiment, the recommendation application is configured to learn, at 106, Gaussian distributions whose overlaps represent relationships between movies, keywords, and/or actors, as well as to learn shift vectors or changes to co-variance matrices, discussed in greater detail below, that represent archetypical roles that actors play. That is, for each movie, keyword, and actor entity, a Gaussian distribution is learned that captures its relationship with other entities and other semantic attributes. In FIG. 2, the keyword distribution 240 overlaps with the movie distribution 210, indicating that the keyword represented by the distribution 240 describes the movie represented by the movie distribution 210. More generally, a high degree of overlap between a keyword distribution and a movie distribution may indicate that the keyword is particularly descriptive of the movie. As another example, the Gaussian distributions representing romance movies may appear close to each other, as they are in the same genre, and actors playing in such movies may appear close to those movies and to each other, which matches the intuition that actors in the same genre may be interchangeable. If multiple keywords describe a movie, then that movie may be represented by a Gaussian distribution with a relatively larger co-variance, i.e., a distribution that is less dense. As yet another example, the movie genre "drama" may cover a relatively large variety of movies, and the Gaussian representation of "drama" may have a relatively large co-variance. Further, there is a natural correspondence between an actor's versatility in playing different roles and the co-variance of the Gaussian distribution representing that actor. That is, the sizes (defined by the co-variance matrices) of the Gaussian distributions, which are similar to blobs in space, are indicative of how ambiguous/versatile the represented entity is, allowing semantic ambiguity to be modeled.

In one embodiment, the training at 106 further encodes representations of roles that actors play in movies, also referred to herein as "character archetypes," as either shift vectors that shift the means of associated movie Gaussian distributions or as changes to the co-variance matrices of those movie distributions. In FIG. 2, shift vectors 252 and 254 are used in the model 200 to represent the villain and hero roles, respectively. By adding the shift vectors 252 and 254 to the movie distribution 210, the actor 220 that plays the villain role and the actor 230 that plays the hero role are shifted apart from each other in the high-dimensional space. It should be understood that the same shift vector may be used for each actor playing a particular archetypical role (e.g., −1 for villains and +1 for heroes) in a corresponding movie, but the interactions between the actors' distributions and the distributions representing movies may change depending on the roles those actors' play. Further, although the lengths and directions of shift vectors are learned, the character archetypes themselves are taken as inputs to the training, and such archetypes may either be user-specified or automatically determined, as discussed in greater detail below.

Although discussed herein primarily with respect to a model with Gaussian distributions representing actors, movies, and keywords, as well as either shift vectors or changes to co-variance matrices representing roles played by the actors in the movies, it should be understood that the shift vectors or changes to co-variance matrices are optional. That is, in some embodiments, shift vectors or changes to co-variances matrices may not be used.

Returning to FIG. 1, the recommendation application receives at 102 input training data that includes actor-role-movie triplets $D_{arm}=\{<a_i, r_i, m_i>\}$, movie-keyword pairs $D_{mk}=\{<m_i, k_i>\}$, and movie-genre pairs $D_{mg}=\{<m_i, g_i>\}$ in one embodiment. A respective Gaussian distribution in D-dimensional space, parametrized by a mean $\mu_i$ and a co-variance matrix $\Sigma_i$ is then employed by the recommendation application to represent each actor, movie, and keyword (including genres). Collectively, these concepts are referred to as entities. In addition, roles played by actors are not modeled as Gaussian distributions, but rather as shift vectors $v_i$ applied to movie Gaussians, or alternatively as changes to the co-variance matrices of movie Gaussians.

As described, at 106 the recommendation application optimizes a model including the Gaussian distributions above, based on training data, by pushing related Gaussian distributions together and unrelated Gaussian distributions apart in a high-dimensional space. In one embodiment, the distance between Gaussian distributions in the high-dimensional space is indicated by a similarity, making the goal of training to produce high similarity between Gaussian distributions representing related movies, keywords, and actors that appear in the training data, and vice versa. In such a case, high and low similarity is defined by separation at a margin, with high similarity distributions being less than a margin m apart and low similarity distributions being more than the margin m apart, as discussed in greater detail below. More formally, the similarity between two entities $e_i$ and $e_j$ may be defined symmetrically as an integral:

$$S_{sym}(e_i, e_j) = \int N(x; \mu_i, \Sigma_i) N(x; \mu_i, \Sigma_i) dx \quad (1)$$
$$= N(\mu_j; \mu_i, \Sigma_i + \Sigma_j)$$
$$= N(\mu_i; \mu_j, \Sigma_i + \Sigma_j)$$

or asymmetrically using the Kullback-Leibler divergence $$S_{asym}(e_i, e_j) = -\int N(x; \mu_i, \Sigma_i) \log \frac{N(x; \mu_j, \Sigma_j)}{N(x; \mu_i, \Sigma_i)} dx \quad (2)$$
$$= \frac{1}{2}\left(tr\left(\Sigma_i^{-1}\Sigma_j\right) + (\mu_i - \mu_j)^T \Sigma_i^{-1}(\mu_i - \mu_j) - D - \log\frac{|\Sigma_j|}{|\Sigma_i|}\right).$$

The symmetrical similarity of equation (1), or the asymmetrical similarity of equation (2), is used to compare movies to keywords and movies to movies during training 106, and the same similarity is also used after the model is trained at 110 to make comparisons between movies or between movies and keywords in order to, e.g., rank the most similar movies to a specified movie or keyword, as discussed in greater detail below. In embodiments where character roles are not modeled using shift vectors (or otherwise), equation (1) or equation (2) may also be used to compare movies and actors. That is, in some embodiments, character roles may be disregarded in the triplet (movie, actor, character role), which may have computational benefits.

In one embodiment, the recommendation application trains the model at 106 by initializing the mean and co-variance matrices of the Gaussian distributions representing the movie, keyword, and actor entities with random values, and then performing an optimization to minimize a margin loss function. During such an optimization, entity pairs that co-occur (e.g., an actor that appears in a movie) move toward each other in the high-dimensional space, and entity pairs that do not co-occur are pushed apart in the high-dimensional space. In a particular embodiment, the recommendation application minimizes, using a gradient-descent technique or any other suitable technique, the following margin loss:

$$\mathcal{L} = \Sigma_{(e_i, e_j) \in D_+} \mathbb{E}\left[[m - S(e_i, e_j) + S(e_i, e^{neg})]_+\right]_{e^{neg}}, \quad (3)$$

where m denotes the margin and $[x]_+$ denotes $\max(0, x)$, a linear function rectified at zero. In such a case, the expectation over a negative example $e^{neg}$ is approximated by sampling $e^{neg}$ during each training iteration. For simplicity, only the diagonal entries of the co-variance matrix are used in one embodiment. Further, the co-variance matrix $\Sigma_i$ of an entity's Gaussian distribution may be represented as $\Sigma_i = \text{diag}(\sigma_i^2)$, where $\sigma_i^2 = (\sigma_{i1}^2, \sigma_{i2}^2, \ldots, \sigma_{iD}^2)$ is a component-wise squared vector and $\sigma_i$ is a vector assigned to each entity. Here, diag( ) places the vector $\sigma_i^2$ on the diagonal of the matrix $\Sigma_i$.

In addition to outputting the Gaussian distributions of the entities, in one embodiment the optimization process is also used to obtain shift vectors in the high-dimensional space that model archetypical roles. Examples of archetypical roles include hero and villain archetypes. As shown, the shift vector 252 on the Gaussian 210 of the movie models the villain archetype role played by the actor 220, while the shift vector 254 models the hero role played by the actor 230. More formally, a shift vector v on the movie Gaussian models an archetypical role, such that the similarity measure for actor $a_i$, movie $m_j$, and archetypical role $r_k$ may be represented symmetrically as $$S_{sym}(a_i, m_j, r_k) = N(\mu_i; \mu_j + v_k, \Sigma_i + \Sigma_j) \quad (4)$$

or asymmetrically as $$S_{asym}(a_i, m_j, r_k) = D_{KL}(N(\mu_i, \Sigma_i) \| N(\mu_j + v_k, \Sigma_j)). \quad (5)$$

The symmetrical similarity of equation (4), or the asymmetrical similarity of equation (5), is used to compare movies to actors during training and thereafter to make comparisons between movies and actors (to, e.g., rank the most similar movies to a specified actor playing a specified role), as discussed in greater detail below. If the user does not wish to specify a particular role played by the actor, then an average vector of all possible roles may be used. And if no character roles have been provided at all, then equations (1) or (2) may be used instead. The intuition behind equation (5) is that actors playing different roles in the same movie should be spatially separated but close to the movie. For example, heroes in a science fiction movie should be separated from villains in the science fiction movie, but both heroes and villains should stay in a proximity of the movie, which should itself be close to the science fiction genre. This intuition is shown in FIG. 2, for example, where the dashed circles 260 and 270 represent the movie Gaussian after the shift vectors 252 and 254, respectively, are added. Different shift vectors for the hero and villain roles create separation between the two actors 220 and 230 that played the hero and villain roles, respectively. That is, the actors 220 and 230 are each pushed closer to respective shifted versions of the movie 210 for the hero and villain roles, and the actors 220 and 230 themselves become more separated. Further, the similarity between movies and keywords/genres remains unchanged, and the margin loss in equation (3) may be retained with negative sampling over all entities and roles.

In an alternative embodiment, rather than representing archetypical roles as shift vectors, the recommendation application may represent archetypical roles as changes to the co-variance of the movie Gaussian. For example, the hero and villain roles may be represented by two different co-variances. The similarity measure for actor $a_i$, movie $m_j$, and archetypical role $r_k$ may then be represented symmetrically as $$S_{sym}(a_i,m_j,r_k)=N(\mu_i;\mu_j+\nu_k,\Sigma_i+\text{diag}(\Sigma_j+\phi_k)), \quad (6)$$

where $\phi_k$ is the change to the co-variance that represents the archetypical role.

In one embodiment, a dropout technique is employed during the training of the model at 106 for regularization purposes. In such a case, for each positive or negative pair of entities in the loss function of equation (3), the recommendation application creates a D dimensional random vector q, with components $q_i \in \{0,1\}$ of the random vector q being independently drawn as 0-1 Bernoulli trials. The probability of drawing 0 is called the dropout probability and denoted herein as p. The recommendation application then component-wise multiplies the vector $$\frac{1}{p}$$

q with the mean vectors $\mu_i$ and $\mu_j$ before computing the similarity function (of equation (1) or (2)). That is, during training, the means of the Gaussians in the high-dimensional space are randomly set to zero, thereby lowering their dimensions in a random manner, prior to computing similarities between the Gaussians (e.g., between movies and keywords). Such dropout regularization may help produce better representations through training by removing the effects of randomly selected dimensions of the mean vectors on the similarity function and reduces co-adaptation of the learned mean vectors. Without dropout regularization, it is possible the mean vectors may become dependent on each other, producing highly effective dimensions that overshadow other dimensions, whereas drop regularization forces the model to rely on other dimensions as well by randomly setting dimensions to 0 so that those dimensions disappear.

In one embodiment, the character archetypes that are modeled by shift vectors in the high-dimensional space are based on manually annotated roles that actors play in movies. In an alternative embodiment, the recommendation application automatically recognizes the character archetypes and roles that actors play in movies. In order to automatically recognize character archetypes and actor roles, the recommendation application first performs coreference resolution to link pronouns in text (e.g., a plot) that describes movies and characters therein. This is based on the assumption that, when identifying character archetypes, the characters in a movie can be defined by their behaviors and how they are described in text. After performing the coreference resolution and identifying characters, the recommendation application further identifies actions performed by the characters, actions that are performed to the characters, and descriptions of the characters. For example, the actions may be represented by verbs that the recommendation application identifies, and the descriptions may be summarized as nouns and adjectives that the recommendation application identifies. The result is a list of words identified for each of a number of categories of actions performed by the characters, actions performed to the characters, and descriptions of the characters. The recommendation application then determines counter-fitted word embeddings, which have been shown to highly correlate with human judgments of word similarity, and the recommendation application further averages the word embeddings and concatenates the averages in a vector that represents the character. In addition, the recommendation application performs clustering on the character representations to identify character archetypes.

After the model of movies, keywords, actors, and roles is trained at 106, the same similarity measures used to train the model are used to query the model at 110. In response to receiving a query at 108, the recommendation application compares entities to terms in the query at 110 in one embodiment, and outputs a ranking of entities based on similarity to the terms in the query, as discussed in greater detail below. In turn, a representation of one or more of the entities in such a ranking that is output may be displayed via, e.g., a display device at 112.

Figure 3:
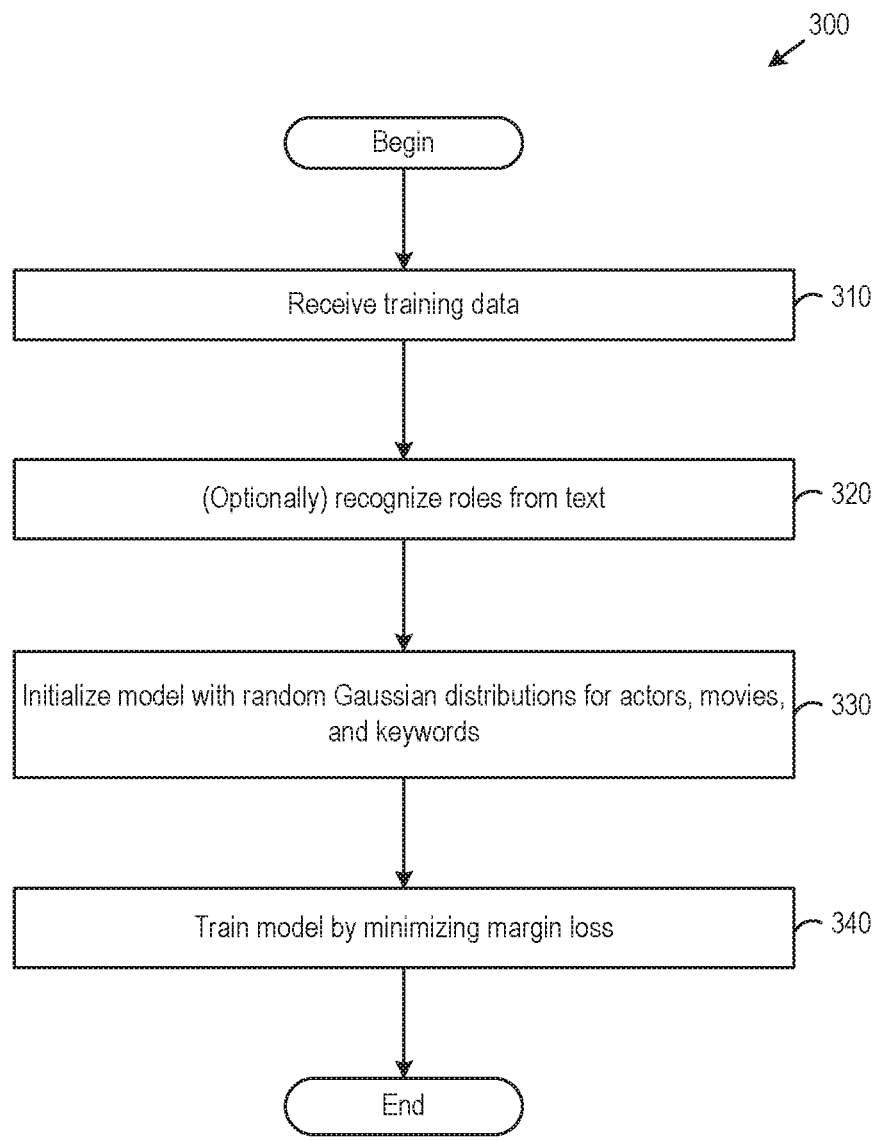
FIG. 3 illustrates a method for training a model of movies, keywords, actors, and roles, according to an embodiment.

FIG. 3 illustrates a method 300 for training a model of movies, keywords, actors, and roles, according to an embodiment. As shown, the method 300 begins at step 310, where a recommendation application receives training data. In one embodiment, the training data includes movie-keyword pairs, movie-genre pairs, and actor-role-movie triplets, as described above. In another embodiment, the recommendation application may not receive role data and instead automatically recognizes character archetypes and roles played by actors.

At step 320, the recommendation application (optionally) recognizes character archetypes and the roles played by actors from text describing, e.g., the plots of movies. In one embodiment, the recommendation application automatically identifies character archetypes and roles played by actors in movies according to method 500, discussed in greater detail below with respect to FIG. 5.

At step 330, the recommendation application initializes a model that includes random Gaussian distributions that represent movies, actors, and keyword entities. In particular, the mean and co-variance matrices of Gaussian distributions representing such entities are initialized with random values.

At step 340, the recommendation application trains the model by minimizing a margin loss. In one embodiment, the training includes performing an optimization in which a gradient descent or other suitable technique is employed to minimize the margin loss of equation (3) using the similarity measures of equations (1) or (2) and equations (4) or (5). In particular, the similarity measures are plugged into the loss function of equation (3). In addition to using the data received at step 310 (and the character archetypes and roles played by actors that is optionally determined at step 320), the recommendation application may sample various negative examples (e.g., negative examples of movies or actors such as an actor that did not appear in a movie or a movie that an actor did not appear in) which may also be used in the training process. In one embodiment, the recommendation application employs a dropout technique during the training for regularization purposes, as described above. The results of training are Gaussian distributions for the actor, movie, and keyword entities, as well as shift vectors modeling archetypical roles (or, alternatively, changes to covariance matrices of movie Gaussian distributions that model archetypical roles). If additional data (e.g., relating to new movies and/or actors) is received subsequent to training the model, then the model may be re-trained to account for such additional data.

Figure 4:
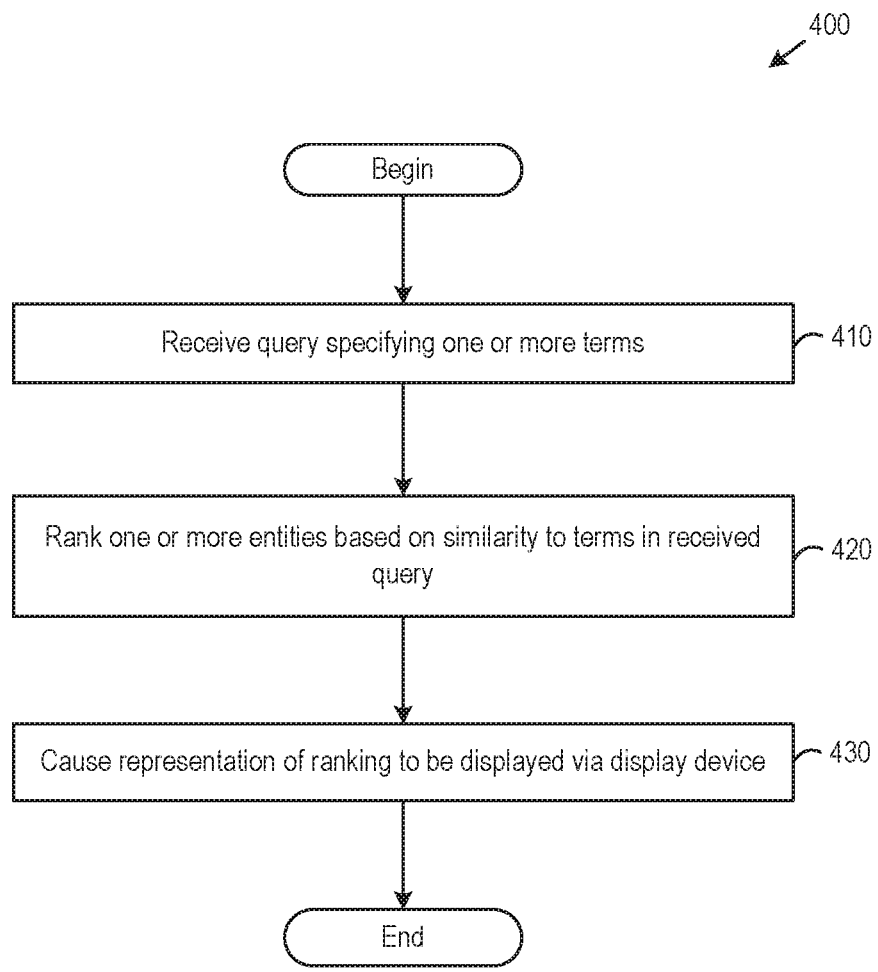
FIG. 4 illustrates a method of utilizing a trained model of movies, keywords, actors, and roles, according to an embodiment.

FIG. 4 illustrates a method 400 of utilizing a trained model of movies, keywords, actors, and roles, according to an embodiment. As shown, the method 400 begins at step 410, where the recommendation application receives a query specifying one or more terms. The query may generally specify any combination of actor, movie, role, and/or keyword, such as a query for a movie similar to a specified movie and a keyword (e.g., a query for movies like movie "A" with keyword "dysfunctional family"), a query for a movie with a specified actor and keyword (e.g., a query for a movie with actor "B" and keyword "science fiction"), a query for movies similar to a movie in which a specified actor played a specified role (e.g., a query for movies similar to a movie in which actor "C" plays a hero), etc. For example, a user wishing to choose between three movie scripts described by different keywords may use the recommendation application to train a model of the movie scripts and previous movies, and the user may then run a query to determine which of the three scripts is most similar to movie "A" that was commercially successful. As another example, a user may, during the casting process, run a query to determine which actor among a number of actors is most suitable for a particular role in a new movie based on similarity. Actors themselves may also use the recommendation application to choose what movies they want to appear in based on, e.g., similarity to themselves or previous movies they have appeared in. As yet another example, the query may be manually entered into, or automatically generated for, a website such as a movie review website, a streamlining media website, or the like, and recommendations provided by the website in response to the query.

At step 420, the recommendation application ranks, using the trained model, one or more entities based on similarity to terms in the received query. As described, the same measure(s) of similarity that were used during training are used after the model is trained to determine similarities. Returning to the example query for a movie similar to a specified movie and keyword, the recommendation application may rank movies based on a similarity indicating how "close" in distance those movies are to the specified movie and keyword in the trained model. In such a case, the recommendation application may use either the symmetrical similarity of equation (1) or the asymmetrical similarity of equation (2) to determine distances in the high-dimensional space, depending on which similarity is used during training of the model. Returning to the example query for movies similar to a movie in which a specified actor played a specified role, the recommendation application may rank the most similar movies to the specified actor playing the specified role, using the symmetrical similarity of equation (4) or the asymmetrical similarity of equation (5) to determine similarities between movies, actors, and roles.

At step 430, the recommendation application causes a representation of the ranking to be displayed to a user via a display device. Any suitable representation of the ranking may be displayed, such as a list specifying one or more of the entities in the ranking, links on a webpage to streaming media content in the ranked order (in which case the webpage may be generated and served to a user's device for display to the user), etc.

Figure 5:
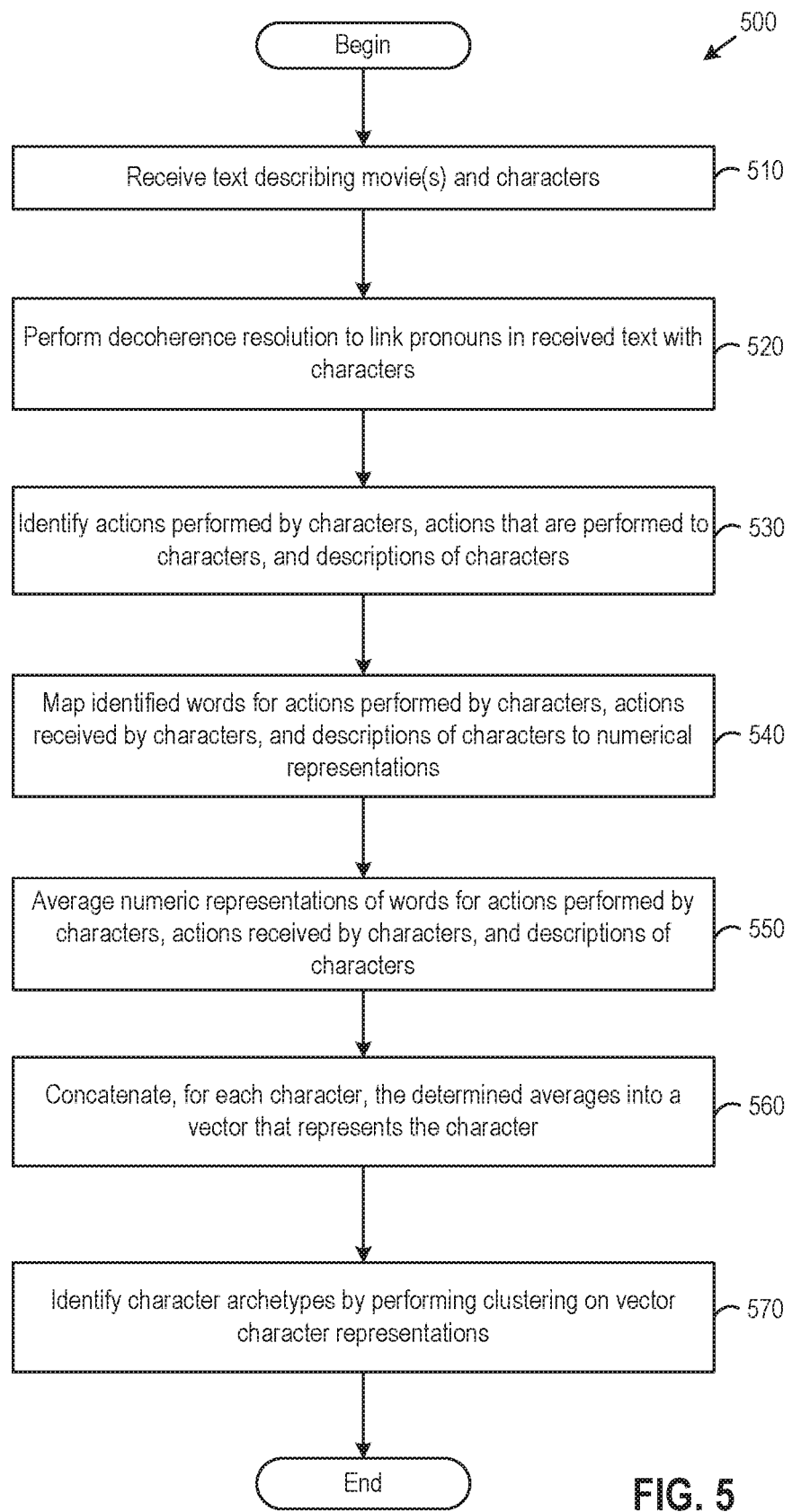
FIG. 5 illustrates a method for identifying character archetypes and roles played by actors, according to an embodiment.

FIG. 5 illustrates a method 500 for identifying character archetypes and roles played by actors, according to an embodiment. As described, the recommendation application may automatically recognize archetypical roles if such role information has not been (manually) specified in the training data. The automatically recognized roles may then be used as part of the input to the training described above with respect to FIGS. 1 and 3.

As shown, the method 500 begins at step 510, where the recommendation application receives text, such as plots, describing one or more movies and characters therein. Then, at step 520, the recommendation application performs coreference resolution to link pronouns in the received text with characters. As described, such coreference resolution is used to determine which character is being referred to when a pronoun is encountered in the received text.

At step 530, the recommendation application identifies words in the received text associated with actions performed by the characters, actions that are performed to the characters (i.e., actions received), and descriptions of the characters. There are public and also proprietary techniques for parsing text. It is assumed that character roles can be defined based on what the characters do (i.e., actions performed), what is done to the characters (i.e., actions received), and how others describe the characters (i.e., character descriptions) in the received text. For example, a hero character may be associated with "save," "rescue," and "help" actions performed; "thank" and "praise" actions received; and character descriptions of "happily," "merrily," and "carefully" that describe the manner in which the hero performs actions. As another example, a villain character may be associated with "destroy" and "ruin" actions performed; "avoid" and "resist" actions received; and character descriptions of "evil" and "angrily" that describe the manner in which the villain performs actions.

At step 540, the recommendation application maps the identified words for the actions performed by the characters, the actions received by the characters, and the descriptions of the characters to numerical representations. In one embodiment, the recommendation application determines counter-fitted word embeddings using a technique, such as word2vec, that maps each of the identified words to a corresponding vector.

At step 550, the recommendation application averages the numerical representations of the words for the actions performed by the characters, the actions received by the characters, and the descriptions of the characters. Returning to the example of the hero character, the recommendation application may average the action performed words of "save," "rescue," and "help," and the recommendation application may similarly average the actions received words of "thank" and "praise" and the character description words of "happily," "merrily," and "carefully."

At step 560, the recommendation application concatenates, for each character, the averages determined at step 550 into a vector that represents the character. Doing so produces, for each character, a high-dimensional vector that includes the average of actions performed words, the average of actions received words, and the average of character description words.

At step 570, the recommendation application identifies character archetypes by performing clustering on the vector character representations determined at step 560. Any suitable clustering technique may be used, such as K-means clustering, K-medoids, Gaussian Mixture Models, OPTICS, spectral clustering, or the like. The clusters define archetypical roles. In particular, each cluster becomes a word in a role vocabulary, and the roles that the character representations belong to may be used to train the model according to the method 300, described above. Optionally, the clusters may also be inspected to determine what the clusters represent (e.g., whether a particular cluster represents "hero" or "villain" based on the characters in the cluster) and to ascertain that the clusters make sense.

Figure 6:
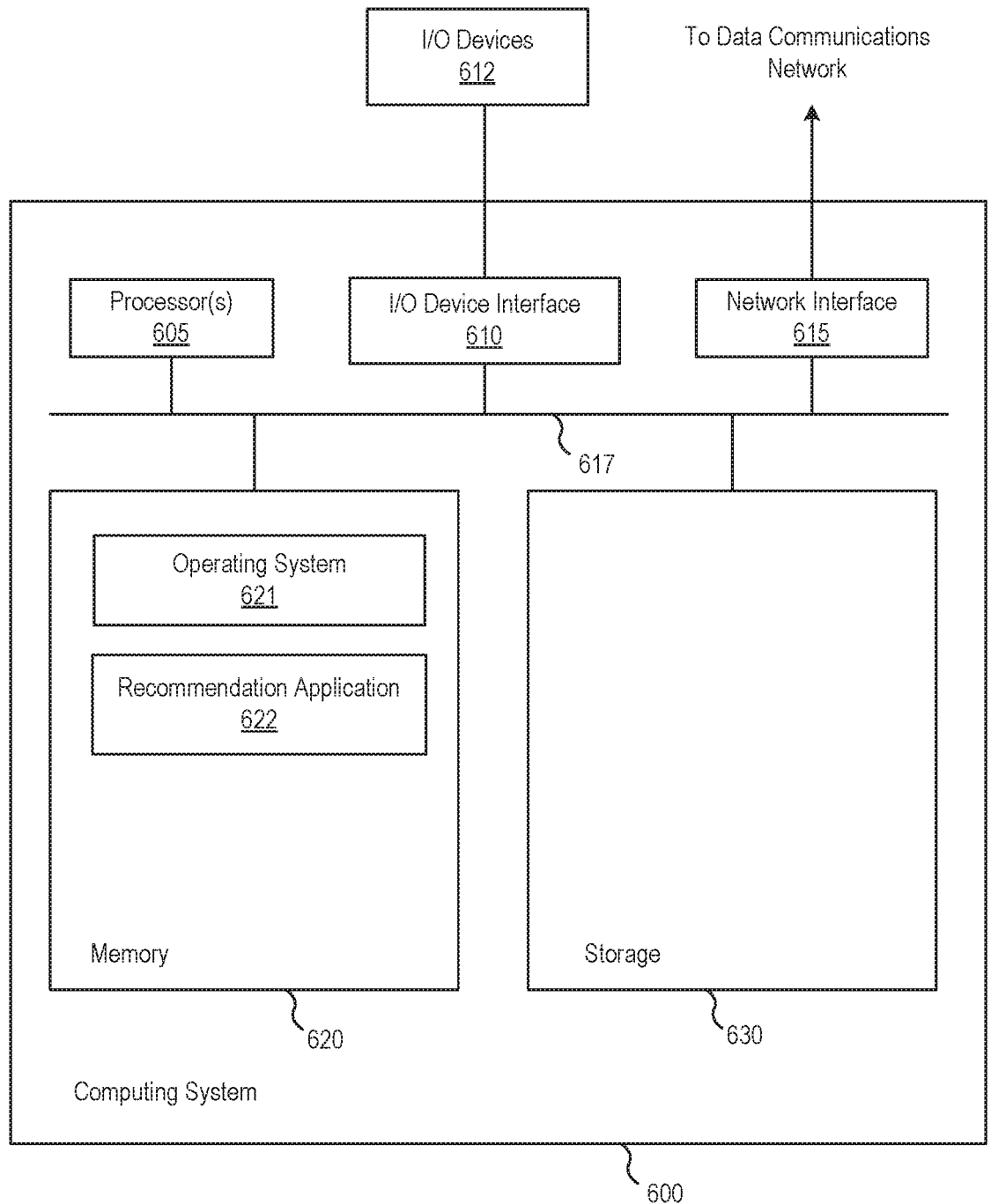
FIG. 6 illustrates a system in which an embodiment may be implemented.

FIG. 6 illustrates a system 600 in which an embodiment may be implemented. As shown, the system 600 includes, without limitation, a central processing unit (CPU) 605, a network interface 615 connecting the system to a network 616, an interconnect 617, a memory 620, and storage 630. The system 600 also includes an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. The CPU 605 is included to be representative of a single CPU, multiple CPUs, a single CPU having multiple processing cores, one or more graphics processing units (GPUs), a combination of such processors, and the like. And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, the system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 620 includes an operating system 621 and a recommendation application 622. The operating system 621 may be, e.g., Linux® or Windows®. The recommendation application 622 is configured to generate a model of relationships between actors, character archetypes, movies, and keywords. In one embodiment, the recommendation application 622 may train a model of movies, keywords, actors, and roles by receiving training data; (optionally) recognizing character archetypes and the roles played by actors from text; initializing a model that includes random Gaussian distributions that represent movies, actors, and keyword entities; and training the model by minimizing a margin loss, according to the method 300 discussed above with respect to FIG. 3. In addition, the recommendation application 622 may utilize a trained model of movies, keywords, actors, and roles by receiving a query specifying one or more terms; ranking, using the model, one or more entities based on similarity to terms in the received query; and causing a representation of the ranking to be displayed to a user via a display device, according to the method 400 discussed above with respect to FIG. 4.

Advantageously, techniques disclosed herein provide a computational understanding of narrative content by modeling actors and their versatility in relation to character archetypes and movies. In particular, a joint machine learning framework is disclosed for embedding actors, character archetypes, movies, and descriptive words as Gaussian distributions in a high-dimensional space, with character archetypes being modeled as shift vectors for the movie Gaussians. In particular, the machine learning model considers the semantic ambiguity of descriptive keywords and genres. Experience has shown that the disclosed model's notion of an actor's versatility, which is represented by the co-variance of a Gaussian distribution representing the actor, substantially agrees with expert opinions and outperforms some other models in selecting actors for movies. More generally, the machine learning model disclosed herein may serve as distant supervision for identifying character archetypes and provides analytics that complement human intuition, such as for the tasks of selecting actors for movies, prediction of movie success based on similarity to other movies, and forecasting of acting careers. In addition, the machine learning model disclosed herein may be used by websites, such as movie review websites, streamlining media websites, or the like, to provide recommendations as well as responses to user queries.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, at a computing device including one or more processors, a plurality of scripts, wherein the plurality of scripts textually describe at least characters;
generating vector representations of the characters based on words associated with actions performed by the characters, actions received by the characters, and descriptions of the characters;
generating, by the one or more processors, archetypes of the characters described in the plurality of scripts based on clustering of the vector representations of the characters;
initializing, by the one or more processors, a machine learning model using the archetypes, the machine learning model including distributed representations in a dimensional space of entities including actors, content, and keywords, wherein the machine learning model is configured to compare the distributed representations in the dimensional space, wherein during initialization of the machine learning model, the distributed representations are assigned random values for positions in the dimensional space;
training the machine learning model based on similarities between the vector representations by:
implementing a random dropout for at least one of the distributed representations before the distributed representations are compared; and
modifying the positions of the distributed representations in the machine learning model based on relatedness between the distributed representations, such that related distributed representations are pushed together and unrelated distributed representations are pushed apart;

wherein the machine learning model is configured to represent actor versatility across the archetypes;

configuring, in the machine learning model, shift vectors or changes to co-variance matrices to modify the distributed representations based on the archetypes;

receiving, at the computing device, a query including one or more terms and a queried archetype; and ranking, by the one or more processors and using the machine learning model and either the shift vectors or the changes to the co-variance matrices, one or more of the actors based at least in part on the actor versatility across the archetypes.

2. The method of claim 1, wherein the ranking of the one or more actors includes ranking one or more of the archetypes of the characters played by the actors in the content.

3. The method of claim 1, further comprising determining a first set of similarities between the entities using a first equation and determining a second set of similarities between the actors, the content, the keywords, and the archetypes using a second equation, wherein the ranking of the one or more of the actors uses at least one of the first set of similarities or the second set of similarities.

4. The method of claim 3, wherein at least one of the first set of similarities or the second set of similarities includes a symmetrical similarity measure.

5. The method of claim 3, wherein each of the first set of similarities and the second set of similarities includes a respective asymmetrical similarity measure.

6. The method of claim 1, wherein generating the archetypes of the characters further comprises:
linking pronouns with the characters in the plurality of scripts by performing coreference resolution;
identifying, in the plurality of scripts, words associated with the actions performed by the characters, the actions received by the characters, and the descriptions of the characters;
mapping the identified words to numerical representations of the words associated with the actions performed by the characters, the actions received by the characters, and the descriptions of the characters; and
generating the vector representations by averaging the numerical representations of the words associated with the actions performed by the characters, the actions received by the characters, and the descriptions of the characters.

7. The method of claim 1, wherein the machine learning model is configured to receive one or more of content-keyword pairs, content-genre pairs, or actor-archetype-content triplets as training data.

8. The method of claim 1, further comprising minimizing a margin of loss associated with the machine learning model.

9. The method of claim 1, wherein the machine learning model is further configured to be trained based on negative examples.

10. The method of claim 1, wherein the machine learning model represents, via the distributed representations, the content and the keywords while capturing a spectrum of semantic meaning of the content, wherein the machine learning model captures semantic ambiguity of the keywords.

11. The method of claim 1, wherein the content comprises movies, and wherein the plurality of scripts comprise movie scripts.

12. The method of claim 1, wherein the distributed representations are defined at least in part by a respective parameter having a plurality of dimensions, wherein comparing the distributed representations includes determining a first similarity of a first dimension of the plurality of dimensions, and determining a second similarity of a second dimension of the plurality of dimensions, wherein the first similarity is subject to the random dropout randomly during a comparison.

13. The method of claim 1, further comprising:
generating a display representation of at least a portion of the ranking, the display representation including an indication of a highest ranked actor of the one or more actors being most suitable for the queried archetype; and
outputting the display representation via a display device.

14. The method of claim 1, wherein the distributed representations are uncertainty representations comprising Gaussian distributions.

15. A computer implemented method of modelling actor versatility based on a plurality of scripts, the computer implemented method comprising:
receiving, at a computing device including one or more processors, a plurality of scripts, the plurality of scripts textually specifying at least keywords and actors;
generating vector representations of characters in the scripts based on words associated with actions performed by the characters, actions received by the characters, and descriptions of the characters;
determining, by the one or more processors, archetypes of the characters based on clustering of the vector representations of the characters;
initializing, by the one or more processors, a machine learning model including distributed representations in a dimensional space of entities including the actors, content, and the keywords, wherein the machine learning model is configured to compare the distributed representations in the dimensional space, wherein during initialization of the machine learning model, the distributed representations are assigned random values for positions in the dimensional space;
training the machine learning model based on similarities between the vector representations by:
implementing a random dropout for at least, one of the distributed representations before the distributed representations are compared; and
modifying the positions of the distributed representations in the machine learning model based on relatedness between the distributed representations, such that related distributed representations are pushed together and unrelated distributed representations are pushed apart;
wherein the machine learning model is configured to represent actor versatility across the archetypes;
configuring, in the machine learning model, shift vectors or changes to co-variance matrices to modify the distributed representations based on the archetypes;
receiving, at the computing device, a query including one or more terms and a queried archetype; and
ranking, by the one or more processors and using the machine learning model and either the shift vectors or the changes to the co-variance matrices, one or more actors of the actors based at least in part on the actor versatility across the archetypes.

16. The computer implemented method of claim 15, further comprising minimizing a margin loss associated with the machine learning model.

17. The computer implemented method of claim 15, further comprising determining a first set of similarities between the entities using a first equation and determining a second set of similarities between the actors, the content, the keywords, and the archetypes using a second equation.

18. The computer implemented method of claim 17, wherein each of the first set of similarities or the second set of similarities includes a respective asymmetrical similarity measure.

19. The computer implemented method of claim 17, wherein at least one of the first set of similarities or the second set of similarities includes a symmetrical similarity measure.

20. A computer implemented method to model actor versatility based on a plurality of scripts, the computer implemented method comprising:
- receiving, at a computing device including one or more processors, a plurality of scripts, wherein the plurality of scripts textually describe at least characters;
- generating, by the one or more processors, archetypes of characters played by actors in the plurality of scripts by:
  - linking pronouns with the characters in the plurality of scripts,
  - identifying words in the plurality of scripts associated with actions performed by the characters, actions received by the characters, and descriptions of the characters,
  - generating vector representations of the characters based on the actions performed by the characters, the actions received by the characters, and the descriptions of the characters, and
  - identifying the archetypes based on clustering of the vector representations of the characters;
- initializing, by the one or more processors, a machine learning model including distributed representations in a dimensional space of entities including the actors, content, and keywords, wherein the machine learning model is configured to compare the distributed representations in the dimensional space, wherein during initialization of the machine learning model, the distributed representations are assigned random values for positions in the dimensional space;
- training the machine learning model based on similarities between the vector representations by:
  - implementing a random dropout for at least one of the c distributed representations before the distributed representations are compared; and
  - modifying the positions of the distributed representations in the machine learning model based on relatedness between the distributed representations, such that related distributed representations are pushed together and unrelated distributed representations are pushed apart;
- wherein the machine learning model is configured to represent actor versatility across the archetypes;
- configuring, in the machine learning model, shift vectors or changes to co-variance matrices to modify the distributed representations based on the archetypes; and
- ranking, by the one or more processors and using the machine learning model and either the shift vectors or the changes to the co-variance matrices, one or more actors of the actors based at least in part on the actor versatility across the archetypes.

* * * * *